(12) United States Patent
Campbell

(10) Patent No.: US 6,988,561 B1
(45) Date of Patent: Jan. 24, 2006

(54) ERGONOMIC PLANAR GRADING HAND TOOL

(76) Inventor: Justin Campbell, 3104 N. Old Wire Rd., Fayetteville, AR (US) 72703

( * ) Notice: Subject to any disclaimer, the term of this patent is extended or adjusted under 35 U.S.C. 154(b) by 0 days.

(21) Appl. No.: 10/732,591

(22) Filed: Dec. 10, 2003

Related U.S. Application Data

(60) Provisional application No. 60/432,846, filed on Dec. 12, 2002.

(51) Int. Cl.
*A01B 1/08* (2006.01)

(52) U.S. Cl. .................. 172/380; 172/371; D8/107; 15/235.4; 15/236.01; 7/116

(58) Field of Classification Search ............. 172/371, 172/375, 377, 380; 404/90, 96, 97, 114, 404/118; D8/107; 15/235.4, 235.7, 235.8, 15/236.01; 7/114, 116; 16/110.1, 112.1
See application file for complete search history.

(56) References Cited

U.S. PATENT DOCUMENTS

| | | | | |
|---|---|---|---|---|
| 1,185,196 A | * | 5/1916 | Grigg | 172/380 |
| 1,279,704 A | * | 9/1918 | Jones | 172/371 |
| 1,650,463 A | * | 11/1927 | Pitts | 172/371 |
| 1,780,741 A | * | 11/1930 | Cadwallader | 172/375 |
| 1,826,098 A | * | 10/1931 | Stephens | 403/256 |
| 1,987,027 A | * | 1/1935 | Rordell | 172/380 |
| 2,040,751 A | * | 5/1936 | Marseilles | 172/375 |
| 2,076,120 A | * | 4/1937 | Cyganick | 172/375 |
| 2,169,557 A | * | 8/1939 | Curtiss | 172/379 |
| 2,340,914 A | * | 2/1944 | Williamson | 172/380 |
| 2,340,917 A | * | 2/1944 | Williamson | 172/380 |
| 2,419,719 A | * | 4/1947 | Kennedy | 172/372 |
| 2,787,204 A | * | 4/1957 | Leckenby | 172/375 |
| 3,465,457 A | * | 9/1969 | Stone | 37/268 |
| 4,299,513 A | * | 11/1981 | Stegmeier | 404/97 |
| 4,397,581 A | * | 8/1983 | Jarvis | 404/97 |
| 4,848,961 A | * | 7/1989 | Rouillard | 404/114 |
| 5,097,910 A | * | 3/1992 | Traczek | 172/375 |
| 5,372,205 A | * | 12/1994 | Velez | 172/371 |
| 5,442,832 A | * | 8/1995 | Tonsager | 15/235.7 |
| 5,452,769 A | * | 9/1995 | Markert | 172/380 |
| 5,664,280 A | * | 9/1997 | Tonsager | 15/235.7 |
| 5,687,448 A | * | 11/1997 | Dye, Jr. | 15/235.8 |
| D391,815 S | * | 3/1998 | Venezio | D8/13 |
| 5,791,708 A | | 8/1998 | Capriotti | 294/55 |
| 6,109,362 A | * | 8/2000 | Simpson, Sr. | 172/375 |
| 6,318,476 B1 | * | 11/2001 | Brewer | 172/371 |
| D452,424 S | * | 12/2001 | Simpson, Sr. | D8/107 |
| 6,379,080 B1 | * | 4/2002 | Saffo, Sr. | 404/118 |
| 6,695,531 B1 | * | 2/2004 | Prescott | 404/118 |

FOREIGN PATENT DOCUMENTS

GB   2360815 A   * 10/2004

* cited by examiner

*Primary Examiner*—Thomas B. Will
*Assistant Examiner*—Alexandra Pechhold
(74) *Attorney, Agent, or Firm*—Head, Johnson & Kachigian

(57) ABSTRACT

A hand tool having a flat, planar blade parallel to a surface and a variable length handle allows efficient and effective grading or leveling of a surface. The device allows for effective grading without undue stress on the body of the operator. The ergonomic design of the device, as well as the functional design, allow for effective and efficient grading of surfaces next to and surrounding sensitive structures.

3 Claims, 5 Drawing Sheets

ERGONOMIC PLANAR GRADING HAND TOOL

REFERENCE TO PENDING APPLICATION

This application is a conversion of U.S. Provisional Patent Application 60/432,846, filed Dec. 12, 2002 entitled "ERGONOMIC PLANAR GRADING HAND TOOL".

REFERENCE TO MICROFICHE APPENDIX

This application is not referenced in any microfiche appendix.

BACKGROUND OF THE INVENTION

1. Field of the Invention.

The present invention relates to a tool for grading, or smoothing over, surfaces of loose material such as dirt, sand or loam. More specifically, the present invention relates to a hand tool having a flat, planar blade that allows granular material to be evenly spread over an area. The device is ergonomically designed to ease its use. Because it is a relatively small tool, it is safe to use around objects requiring delicate treatment.

2. Prior Art.

Landscaping, construction and other arts all require adequate methods of grading surfaces. When a large surface is to be graded, a bulldozer or backhoe may be used. For smaller areas, large equipment is inappropriate. This is especially true when working next to a house, building, deck, parking lot, driveway or other structures. Using large bulky equipment such as a bulldozer may easily result in damaging such structures.

When working close to structures that may not be damaged, a variety of existing hand tools have been used. Shovels and hoes have both been used to attempt to grade or level a surface. These devices are generally inefficient because they are designed to break up, not smooth over, a surface consisting of dirt, sand or the like. In addition, the thrusting motion required for use of shovels and hoes can inadvertently result in damage to close by structures. A shovel must be thrust through the ground and it is relatively easy for the blade to accidentally knock against a close by structure. Bricks, wood and concrete can easily be chipped by this kind of contact. Similarly, the thrusting and dropping motion of a hoe may cause similar damage. Such damage to structures not only abrogates the aesthetic qualities of a structure, but may also damage functional aspects of it. For example, it is known in the art to include cooling elements within a concrete deck surrounding a pool to avoid people from burning their feet. Striking such a deck having an external cooling surface can damage and cause extremely costly damage to the structure.

Smaller hand tools, such as a spade, may be used to grade surfaces close to sensitive structures such as an internally cooled pool deck. However, because these tools are small, they generally require the operator to either bend over or work on his or her hands and knees. This is an uncomfortable and non-ergonomic position.

Those skilled in the art of physics will appreciate that there are other disadvantages in the use of shovels, hoes, pick axes and spades for grading or leveling a surface. Significant force is applied to the distal end of such tools. This requires the user to apply significant contrary force on the handle end of such a tool. Alternatively, a user may use one arm and hand to serve as a fulcrum and the other arm and hand to apply force to work the tool in a lever type of action. This causes significant strain to the arms, shoulders and back of the user.

It is therefore desirable to provide a hand tool for adequately grading and leveling surfaces close to relatively sensitive structures.

It is also desirable to provide an adequate grading tool that is ergonomic and comfortable for the operator.

SUMMARY OF THE INVENTION

The present invention comprises an ergonomic grading tool that may be used to grade dirt, sand, gravel, mud and is useful in trenching SB2 gravel prior to laying a foundation. The tool has a handle that is generally long enough such that the working portion of the tool may lay on the ground while a person standing up may actuate it. This generally requires the handle to be about 4 feet in length. It may have a variety of shapes and be comprised of a variety of materials.

The grading portion of the tool is comprised of a flat, planar blade that is generally horizontal and parallel to the surface to be graded. It also includes a backstop that aids in spreading of the material being graded. The handle attaches to the grading portion of the tool at the top end of the backstop. The backstop allows material that is collected as the blade moves across a surface to be graded to more evenly spread to either side of the motion of the grading.

The tool may optionally include a means for replacing the handle with a different one. In some situations, it may be desirable to have a handle only one or two feet long. By allowing replacement of the handle, the same tool may be used in a variety of situations.

Because of the novel design of the tool, the grading action of the tool may be actuated by operating the handle in a rowing type of motion. This allows the operator to stand upright and actuate the grading action of the tool with minimum strain on his arms, back and shoulders. The strain placed on the operator with the present tool is negligible when compared to the strain of using a shovel, hoe or spade for a similar function. The structure of the tool is also better suited for grading or leveling than are other existing tools in the prior art. Other hand tools currently used for grading small areas and grading areas around sensitive structures are generally designed to break up and dishevel surfaces and materials. The tool disclosed herein is specifically designed for the opposite purpose.

DETAILED DESCRIPTION OF THE PREFERRED EMBODIMENTS

Figure 1:
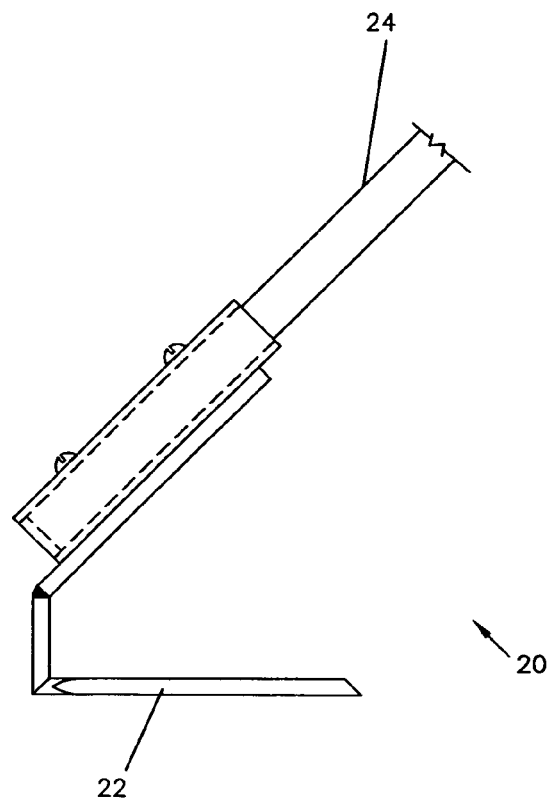
FIG. 1 shows a side view of the invention.
Figure 2:
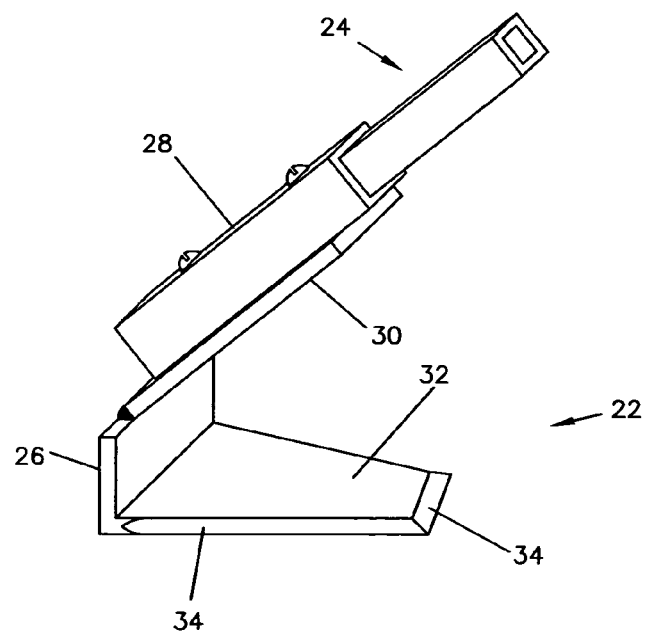
FIG. 2 shows an enlarged perspective view of the tool portion of the invention.
Figure 3:
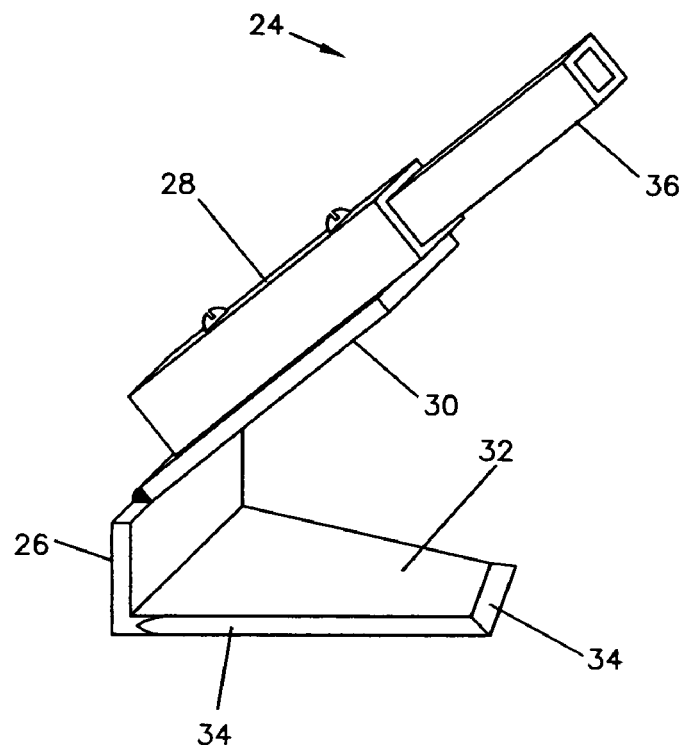
FIG. 3 shows another perspective view of the tool portion of the present invention.
Figure 4:
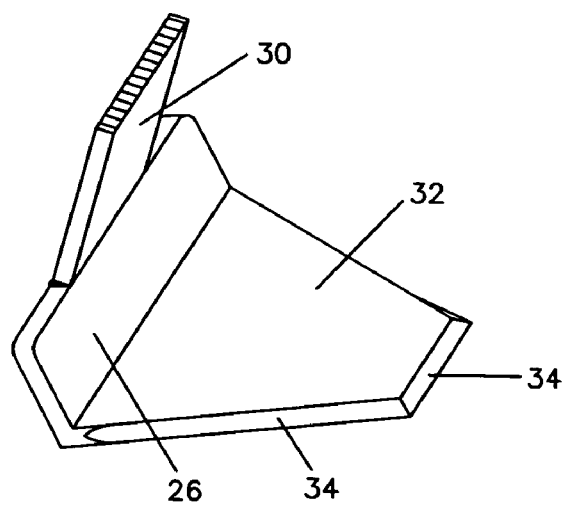
FIG. 4 shows an enlarged perspective view of the blade of the present invention.
Figure 5:
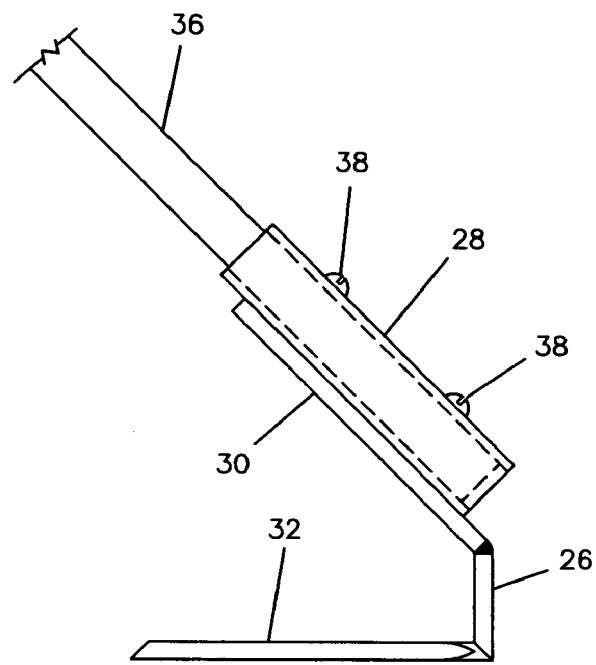
FIG. 5 shows a side view of the present invention.
Figure 6:
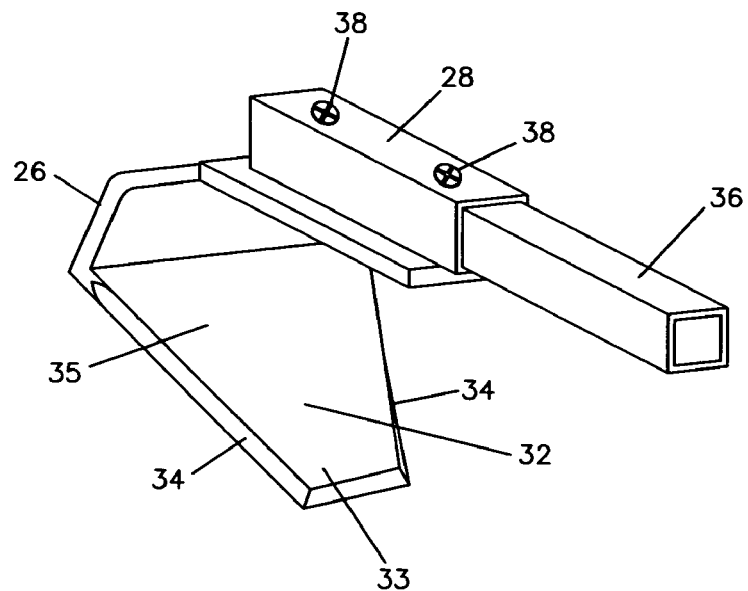
FIG. 6 shows another perspective view of the present invention.
Figure 7:
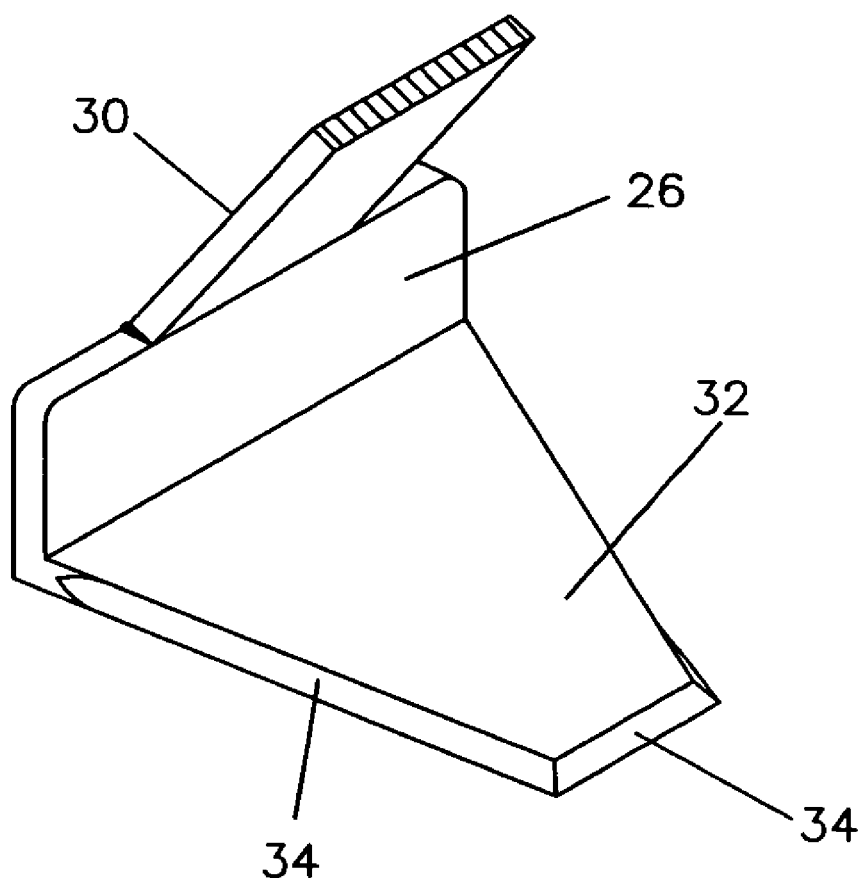
FIG. 7 shows another enlarged view of the tool portion of the present invention.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the present invention, a flat, planar blade is used as a grading tool and extends in the same direction as the handle. The handle and blade are preferably at a 45° angle. However, an angle from 35° to 55° is suitable. The present invention also preferably includes a backstop to assist in spreading the material that is being graded or leveled. FIGS. 1 through 7 illustrate the preferred embodiment of the present invention. Those skilled in the art, however, will appreciate that the present invention may be practiced in a variety of shapes.

As shown in FIGS. 1 through 7, hand tool 20 comprises a handle 24 and a grader 22. Grader 22 comprises a blade 32 having a beveled edge 34. Grader 22 also comprises backstop 26. Backstop 26 does not have beveled edges. However, beveling the edges of backstop 26 does not abrogate its usefulness. Generally, blade 32 and backstop 26 are perpendicular to each other. This results in handle 24 being at approximately a 45° angle to blade 32 and a 135° angle to backstop 26. In this particular embodiment, the tool also comprises a base plate 30. A handle sleeve 28 is brased or welded to base plate 30. The handle rod 36 fits within sleeve 28. Mounting screws 38 hold handle rod 36 firmly in place within sleeve 28.

In this particular embodiment, mounting screws 38 may be removed, thereby allowing handle rod 36 to be removed. This allows handle rod 36, which is designed for operating the tool in a standing position, to be replaced with a smaller handle rod. The actual length of handle rod 36 does not alter the functional aspects of the present invention. However, it is generally preferred that handle rod 36 extend for at least four feet to facilitate easy use while in a standing position. Those skilled in the art will appreciate that it is sometimes desirable to utilize a tool while in a kneeling or crawling position. In such situations, a shorter handle is desirable. While it is preferable to have a handle rod 36 that may be removed from a sleeve 28 and replaced, those skilled in the art will appreciate that it may be simpler in design to have a permanent handle that may not be interchanged with other handles. In such a situation, sleeve 28 is unnecessary and handle rod 36 may be directly attached to base plate 30. Alternatively, base plate 30 may also not be used and handle rod 36 may be directly attached to backstop 26.

In this particular embodiment, handle rod 36 is parallel in shape, as is sleeve 28. That particular geometry is inconsequential in the actuation of the tool of the present invention. The sleeve and handle rod may be cylindrical, parallelepiped or have a variety of other shapes. Those skilled in the art will appreciate that the shape of the handle sleeve and handle rod may vary, so long as handle rod 36 is long enough to facilitate proper actuation of the tool.

Handle rod 36 may be comprised of any of a variety of materials, including metals, plastics and wood. Handle rod 36 may also include rubber, plastic, fibrous or other coatings to aid in gripping of the handle rod by the operator. Foam may also be employed as a coating to increase comfort in using the tool. Grader 22 may similarly be comprised of a variety of materials. Generally metals such as iron, titanium and steel as well as carbon fiber are preferred due to their strength. Softer materials, such as wood, deteriorate rapidly when used to grade materials such as gravel.

Blade 32 is generally trapezoidal in shape. It is generally preferred that forward end 33 of blade 32 be flat and not pointed. A pointed forward end results in more of a plowing type action. Flat forward end 33 of blade 32 ensures that a grading action is applied to the surface to which the tool contacts. It is also preferred that blade sides 35 taper outwardly as they move away from front end 33. This allows for proper spreading of the material being graded.

As described above, it is generally undesirable for blade 32 to have a triangular shape. The trapezoidal shape is the most beneficial design. Blade 32 may have a square shape, but this is not preferred as the trapezoidal shape provides for superior spreading of the material being graded. In addition, it is desirable that the edge of the blade 34 be beveled. It is also preferred that blade 32 is substantially flat and planar. Although blade 32 may be slightly concave up or down, a flat design provides superior grading. This feature, along with other aspects of the invention, facilitate the superior spreading, leveling and grading capabilities of the present invention.

Backstop 26 is generally rectangular in shape and is perpendicular to blade 32. Although a perpendicular angle of backstop 26 to blade 32 is preferred, a slightly acute or obtuse angle is also suitable. The perpendicular angle of backstop 26 generally provides superior performance and ease in manufacture. However, changing the perpendicular angle does not prevent practice of the present invention.

Backstop 26 is preferably rectangular in shape. Although it may be trapezoidal also, the rectangular shape generally provides superior spreading and leveling of the surface being graded. In the preferred embodiment, backstop 26 is not beveled. However, those skilled in the art will appreciate that beveling backstop 26 will not substantially impact its performance. Preferably, backstop 26 is formed from the same piece of metal, plastic or wood as blade 32. However, those skilled in the art will appreciate that it is also possible to weld, brase, rivet, bolt, nail or glue separate pieces of material to one another to form the blade 32 and backstop 26 combination.

Figure 8:
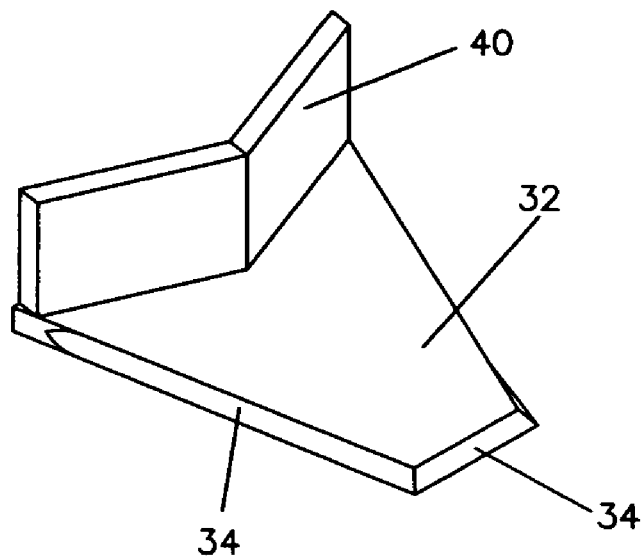
FIG. 8 shows an alternative design of the present invention.
Figure 9:
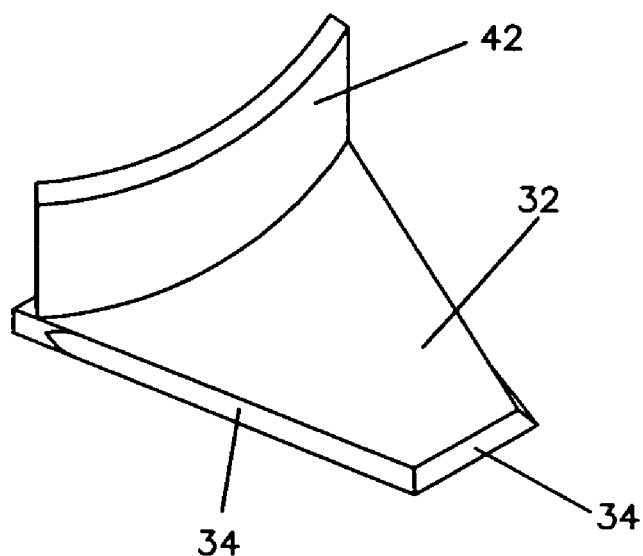
FIG. 9 shows an alternative design of the present invention.

FIGS. 8 and 9 show alternative designs for the backstop of the invention. In these designs, blade 32 remains trapezoidal. However, FIG. 8 shows a modified alternative backstop 40. The angled nature of the backstop facilitates spreading of the material to be graded. FIG. 9 shows modified backstop 42 that is concave. This design also facilitates spreading of the material being graded. FIGS. 8 and 9 are included to illustrate that the backstop of the invention does not need to be flat. While grading a surface, some of the material being graded runs over the top of blade 32. So long as the design of the backstop allows this material to fall over the sides of blade 32, the invention will perform sufficiently.

Handle bar 36, sleeve 28 or base plate 30 are preferably attached to backstop 26 at the top. However, those skilled in the art will appreciate that it may also be attached at other places other than the top center of backstop 26. The top center placement of base unit 30 is ergonomically preferable.

To actuate the tool of the present invention, a standing operator grasps handlebar 36 at its distal end. He then performs a raking type action on handlebar 26 as blade 32 lies parallel to the surface to be graded, pulling the tool toward him. Little effort is required and strain on the operator is minimal. This operation is repeated over the entire surface to be graded until the surface is level.

Whereas, the present invention has been described in relation to the drawings attached hereto, it should be understood that other and further modifications, apart from those shown or suggested herein, may be made within the spirit and scope of this invention.

What is claimed is:

1. An ergonomic grading tool comprising:
   a handle comprising a base plate having a top and a bottom and fixedly attached to a sleeve designed to accommodate a removably affixed handle rod;
   a substantially rectangular backstop having a top and a bottom, the top being fixedly attached to the bottom of the base plate such that the backstop and the base plate form an approximately 135° angle and wherein the bottom of the backstop has a length;
   a substantially trapezoidal-shaped planar blade having two sides having equal lengths, a front having a length, and a back having a length greater than the length of the front and equal to the length of the bottom of the backstop;
   wherein the back of the blade is fixedly and rigidly attached to the bottom of the backstop such that the blade and the backstop form an approximately 90° angle and the blade and the baseplate of the handle form an approximately 45° angle.

2. The tool of claim 1 wherein the backstop is planar.

3. The tool of claim 1 wherein the backstop is concave.

\* \* \* \* \*